(12) United States Patent
Ahn et al.

(10) Patent No.: US 11,363,613 B2
(45) Date of Patent: *Jun. 14, 2022

(54) WIRELESS COMMUNICATION TERMINAL AND WIRELESS COMMUNICATION METHOD FOR TRANSMITTING UPLINK BY MULTIPLE USERS

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 16/924,199

(22) Filed: Jul. 9, 2020

(65) Prior Publication Data

US 2020/0344773 A1 Oct. 29, 2020

Related U.S. Application Data

(63) Continuation of application No. 16/752,616, filed on Jan. 25, 2020, now Pat. No. 11,006,434, which is a
(Continued)

(30) Foreign Application Priority Data

Dec. 31, 2014 (KR) .................. 10-2014-0195871
Feb. 10, 2015 (KR) .................. 10-2015-0020526

(51) Int. Cl.
*H04W 72/12* (2009.01)
*H04W 84/12* (2009.01)
(Continued)

(52) U.S. Cl.
CPC ....... *H04W 72/12* (2013.01); *H04W 72/1284* (2013.01); *H04W 74/08* (2013.01); *H04W 84/12* (2013.01); *H04W 74/004* (2013.01)

(58) Field of Classification Search
CPC .. H04W 72/12; H04W 74/08; H04W 72/1284
(Continued)

(56) References Cited

U.S. PATENT DOCUMENTS 5,757,788 A * 5/1998 Tatsumi .................. H04J 3/22
  370/336
7,660,280 B2 2/2010 Abedi
(Continued)

FOREIGN PATENT DOCUMENTS

KR  10-2012-0072331   7/2012
WO  2011/108832       9/2011
WO  2016/108672       7/2016

OTHER PUBLICATIONS

Non-Final Office Action for U.S. Appl. No. 16/752,616, dated Sep. 14, 2020 (now U.S. Pat. No. 11,006,434).
(Continued)

*Primary Examiner* — Angel T Brockman
(74) *Attorney, Agent, or Firm* — Ladas & Parry, LLP

(57) ABSTRACT

The present invention relates to a wireless communication terminal and a wireless communication method for efficiently scheduling simultaneous uplink transmissions of a plurality of terminals.
To this end, provided are a wireless communication terminal, the terminal including: a transceiver; and a processor, wherein the processor is configured to: generate an uplink
(Continued)

packet, wherein a predetermined field of a MAC header of the uplink packet indicates information on uplink data of the terminal, and transmit the generated uplink packet to a base wireless communication terminal, and a wireless communication method using the same.

14 Claims, 21 Drawing Sheets

Related U.S. Application Data continuation of application No. 15/638,307, filed on Jun. 29, 2017, now Pat. No. 10,582,520, which is a continuation of application No. PCT/KR2015/014585, filed on Dec. 31, 2015.

(51) Int. Cl.
    *H04W 74/08* (2009.01)
    *H04W 74/00* (2009.01)
(58) Field of Classification Search
    USPC .......................................................... 370/389
    See application file for complete search history.

(56) References Cited

U.S. PATENT DOCUMENTS

| | | |
|---|---|---|
| 9,826,532 B1 | 11/2017 | Chu et al. |
| 2012/0236840 A1 | 9/2012 | Kim et al. |
| 2013/0294431 A1 | 11/2013 | Wang et al. |
| 2014/0161012 A1 | 6/2014 | Zhong et al. |
| 2016/0014803 A1 | 1/2016 | Merlin et al. |
| 2016/0227533 A1 | 8/2016 | Josiam et al. |
| 2017/0127298 A1 | 5/2017 | Ryu et al. |
| 2017/0303292 A1 | 10/2017 | Ahn et al. |
| 2017/0311310 A1 | 10/2017 | Ryu et al. |
| 2020/0163098 A1 | 5/2020 | Ahn et al. |

OTHER PUBLICATIONS

International Search Report for PCT/KR2015/014585 dated May 10, 2016 and its English translation from WIPO (published as WO 2016/108672).
Written Opinion of the International Searching Authority for PCT/KR2015/014585 dated May 10, 2016 and its English translation from WIPO (published as WO 2016/108672).
International Preliminary Report on Patentability (Chapter I) for PCT/KR2015/014585 dated July 4, 2017 and its English translation from WIPO (published as WO 2016/108672)
Supplemental Notice of Allowance for U.S. Appl. No. 15/638,307 dated Dec. 26, 2019 (now published as US 2017/0303292).
Notice of Allowance for U.S. Appl. No. 15/638,307 dated Oct. 22, 2019 (now published as US 2017/0303292).
Non-Final Office Action for U.S. Appl. No. 15/638,307 dated Apr. 12, 2019 (now published as US 2017/0303292).
Office Action dated Sep. 14, 2021 for Korean Patent Application No. 10-2021-7021795 and its English translation provided by Applicant's foreign counsel.

\* cited by examiner

Target BSS

WIRELESS COMMUNICATION TERMINAL AND WIRELESS COMMUNICATION METHOD FOR TRANSMITTING UPLINK BY MULTIPLE USERS

CROSS-REFERENCE TO RELATED APPLICATIONS

This application is a continuation of U.S. patent application Ser. No. 16/752,616 filed on Jan. 25, 2020, which is a continuation of U.S. patent application Ser. No. 15/638,307 filed on Jun. 29, 2017, issued as U.S. Pat. No. 10,582,520 dated Mar. 3, 2020, which is a continuation of International Patent Application No. PCT/KR2015/014585 filed on Dec. 31, 2015, which claims the priority to Korean Patent Application No. 10-2014-0195871 filed in the Korean Intellectual Property Office on Dec. 31, 2014, and Korean Patent Application No. 10-2015-0020526 filed in the Korean Intellectual Property Office on Feb. 10, 2015, the entire contents of which are incorporated herein by reference.

TECHNICAL FIELD

The present invention relates to a wireless communication terminal and a wireless communication method for multi-user uplink transmission, and more particularly, to a wireless communication terminal and a wireless communication method for efficiently scheduling simultaneous uplink transmissions of a plurality of terminals.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to reduce the possibility of collision of data transmission of a plurality of terminals in a dense user environment and to provide a stable data communication environment.

Also, the present invention has an object to provide a method by which a plurality of terminals can efficiently perform multi-user uplink transmission.

Technical Solution

In order to achieve the objects, the present invention provides a wireless communication method and a wireless communication terminal as below.

First, an exemplary embodiment of the present invention provides a wireless communication terminal, including: a transceiver configured to transmit and receive a wireless signal; and a processor configured to control an operation of the wireless communication terminal, wherein the processor generates an uplink packet, wherein a predetermined field of a preamble of the uplink packet indicates information for multi-user uplink transmission scheduling of a base wireless communication terminal, and transmits the generated uplink packet to the base wireless communication terminal.

In this case, the information for multi-user uplink transmission scheduling may indicate information of uplink data in an uplink transmission data queue of the terminal.

According to an embodiment, the information of the uplink data may indicate at least one of an access class and transmission time information of the additional uplink data.

In this case, the base wireless communication terminal may trigger a multi-user uplink transmission based on the transmitted information for the multi-user uplink transmission scheduling.

According to an embodiment, the base wireless communication terminal may accumulate the information for the multi-user uplink transmission scheduling obtained from a plurality of terminals in a multi-user uplink information queue, and the multi-user uplink transmission may be triggered when the accumulated value of the multi-user uplink information queue is greater than a predetermined threshold.

According to another embodiment, the base wireless communication terminal may set a separate timer for the multi-user uplink transmission scheduling and the multi-user uplink transmission may be triggered when the timer expires.

In addition, an exemplary embodiment of the present invention provides a wireless communication method of a wireless communication terminal, including: generating an uplink packet, wherein a predetermined field of a preamble of the uplink packet indicates information for multi-user uplink transmission scheduling of a base wireless communication terminal; and transmitting the generated uplink packet to the base wireless communication terminal.

Next, another exemplary embodiment of the present invention provides a base wireless communication terminal, including: a transceiver configured to transmit and receive a wireless signal; and a processor configured to control an operation of the base wireless communication terminal, wherein the processor receives an uplink packet including information for multi-user uplink transmission scheduling of the base wireless communication terminal from at least one terminal, allocates an independent backoff counter for the multi-user uplink transmission, and performs a backoff procedure for a multi-user uplink transmission using an allocated backoff counter.

In this case, the information for the multi-user uplink transmission scheduling may be extracted from a predetermined field of a preamble of the uplink packet.

According to an embodiment, the base wireless communication terminal may accumulate the information for the multi-user uplink transmission scheduling obtained from a plurality of terminals in a multi-user uplink information queue, and allocate a backoff counter for the multi-user uplink transmission when the accumulated value of the multi-user uplink information queue is greater than a predetermined threshold.

According to another embodiment, the base wireless communication terminal may set a separate timer for the multi-user uplink transmission scheduling and allocate a backoff counter for the multi-user uplink transmission when the timer expires.

In this case, the backoff procedure for the multi-user uplink transmission of the base wireless communication terminal may be performed simultaneously with a backoff procedure for a downlink data transmission of the base wireless communication terminal.

In addition, a backoff procedure of a terminal that transmitted the information for the multi-user uplink transmission scheduling to the base wireless communication terminal is canceled.

In addition, another exemplary embodiment of the present invention provides a wireless communication method of a base wireless communication terminal, including: receiving an uplink packet including information for multi-user uplink transmission scheduling of the base wireless communication terminal from at least one terminal; allocating an independent backoff counter for the multi-user uplink transmission; and performing a backoff procedure for a multi-user uplink transmission using an allocated backoff counter.

Next, yet another exemplary embodiment of the present invention provides a base wireless communication terminal, including: a transceiver configured to transmit and receive a wireless signal; and a processor configured to control an operation of the base wireless communication terminal, wherein the processor transmits a frame for NAV setting for a multi-user uplink transmission, receives CTS frames simultaneously transmitted by a plurality of terminals corresponding to the frame for NAV setting, and transmits a trigger message triggering a multi-user uplink transmission in response to the received CTS frames.

According to an embodiment, the frame for NAV setting bay be an RTS or a CTS of a predetermined format.

According to another embodiment, the frame for NAV setting may be a multi-user RTS.

In this case, the frame for NAV setting may request transmission of CTS frames of terminals to perform uplink data transmission.

In addition, CTS frames simultaneously transmitted by the plurality of terminals may have the same waveform.

In addition, the CTS frames may be transmitted through a channel indicated by the frame for NAV setting.

In addition, yet another exemplary embodiment of the present invention provides a wireless communication method of a base wireless communication terminal, the method comprising: transmitting a frame for NAV setting for a multi-user uplink transmission; receiving CTS frames simultaneously transmitted by a plurality of terminals corresponding to the frame for NAV setting; and transmitting a trigger message triggering a multi-user uplink transmission in response to the received CTS frames.

Next, still another exemplary embodiment of the present invention provides a wireless communication terminal, including: a transceiver configured to transmit and receive a wireless signal; and a processor configured to control an operation of the wireless communication terminal, wherein the processor generates an uplink data packet, wherein a predetermined field of a MAC header of the uplink data packet indicates information on additional uplink data of the terminal, and transmits the generated uplink data packet to a base wireless communication terminal.

In this case, information of the predetermined field of the MAC header may be used for multi-user uplink transmission scheduling of the base wireless communication terminal.

According to an embodiment, the predetermined field may indicate at least one of an access class and transmission time information of the additional uplink data.

According to another embodiment, the predetermined field may be a 1-bit indicator indicating whether or not additional uplink data is present.

In this case, the base wireless communication terminal may update a multi-user uplink information queue based on information of the predetermined field obtained from a plurality of terminals, and schedule a multi-user uplink transmission based on the updated multi-user uplink information queue.

According to an embodiment, the base wireless communication terminal may accumulate transmission time information of additional uplink data obtained from the plurality of terminals in the multi-user uplink information queue, and trigger the multi-user uplink transmission when the accumulated value of the multi-user uplink information queue is greater than a predetermined threshold.

According to another embodiment, the base wireless communication terminal may store identifier information of a terminal indicating that additional uplink data is present through the predetermined field in the multi-user uplink information queue, and trigger the multi-user uplink transmission when the number of identifiers of terminals stored in the multi-user uplink information queue is greater than a predetermined number.

In addition, still another exemplary embodiment of the present invention provides a wireless communication method of a wireless communication terminal, including: generating an uplink data packet, wherein a predetermined field of a MAC header of the uplink data packet indicates information on additional uplink data of the terminal; and transmitting the generated uplink data packet to a base wireless communication terminal.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0195871 and 10-2015-0020526 filed in the Korean Intellectual Property Office and the embodiments and mentioned items described in the respective application, which forms the basis of the priority, shall be included in the Detailed Description of the present application.

Figure 1:
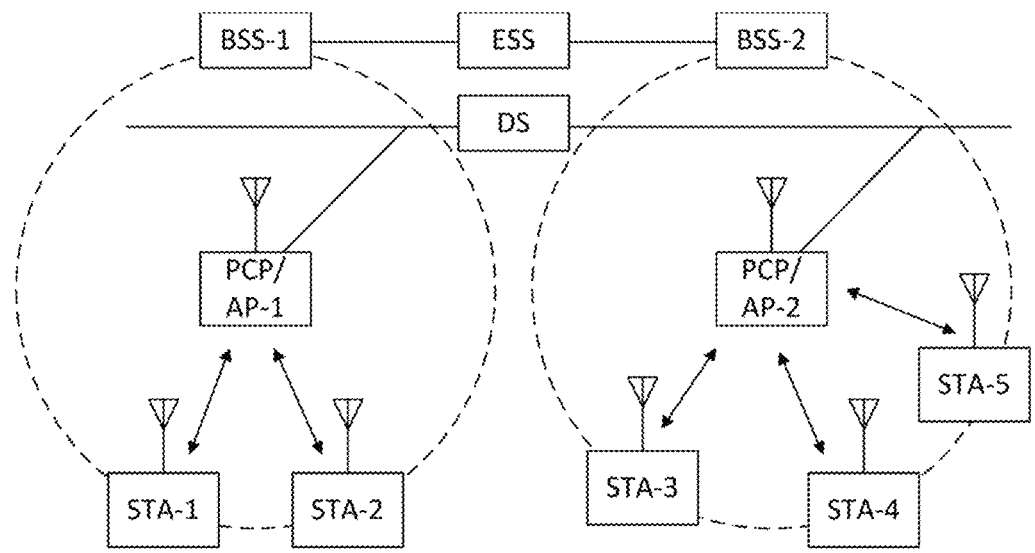
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
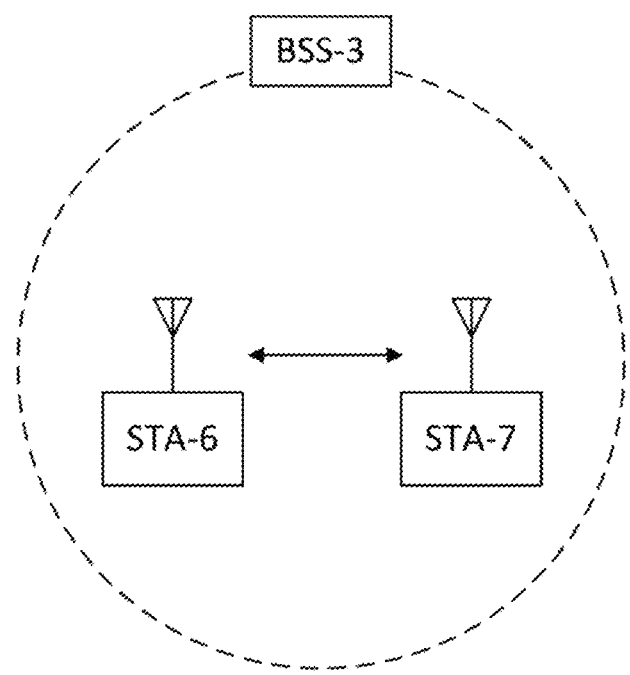
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
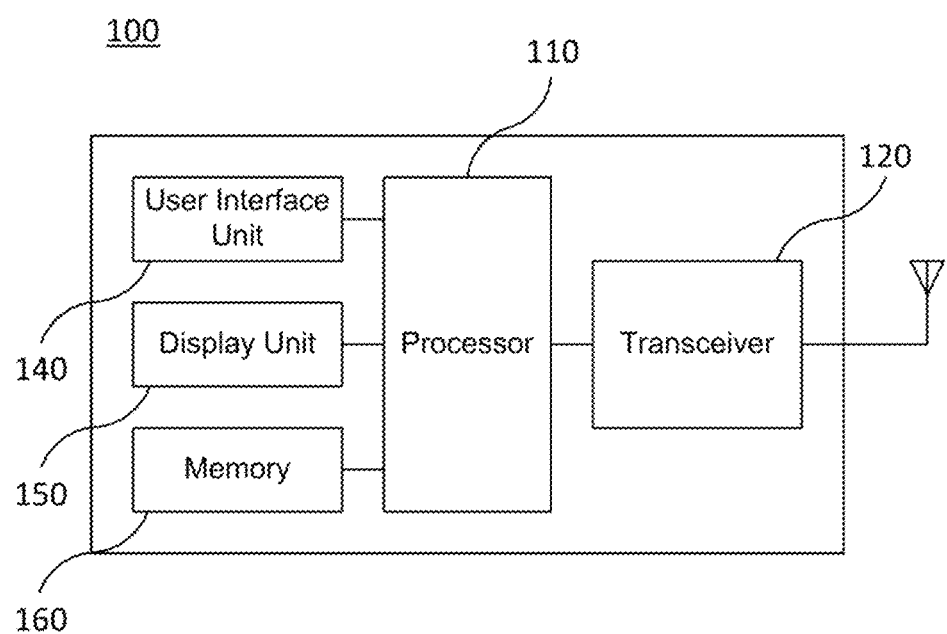
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
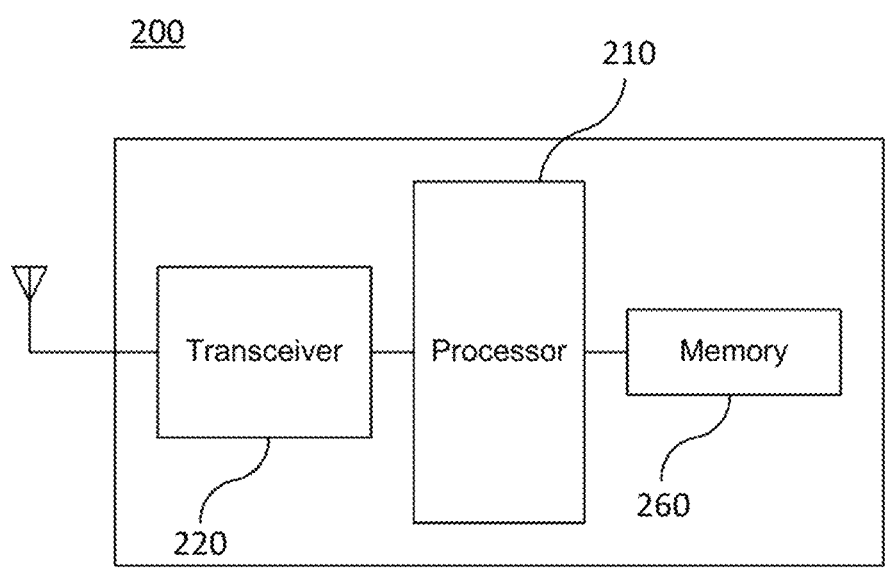
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
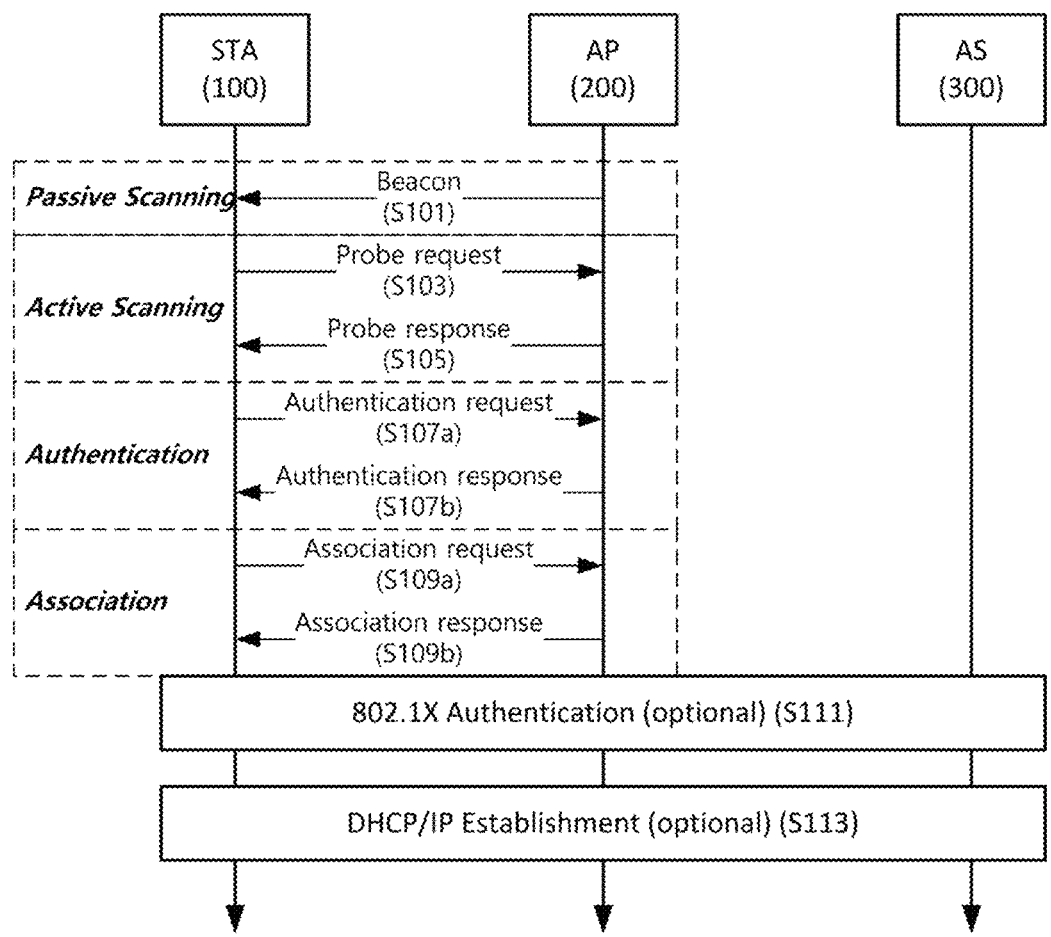
FIG. 5 is a diagram schematically illustrating a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
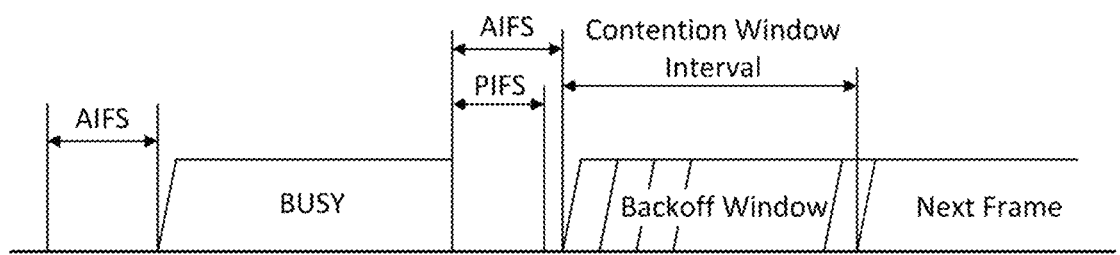
FIG. 6 is a diagram illustrating a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
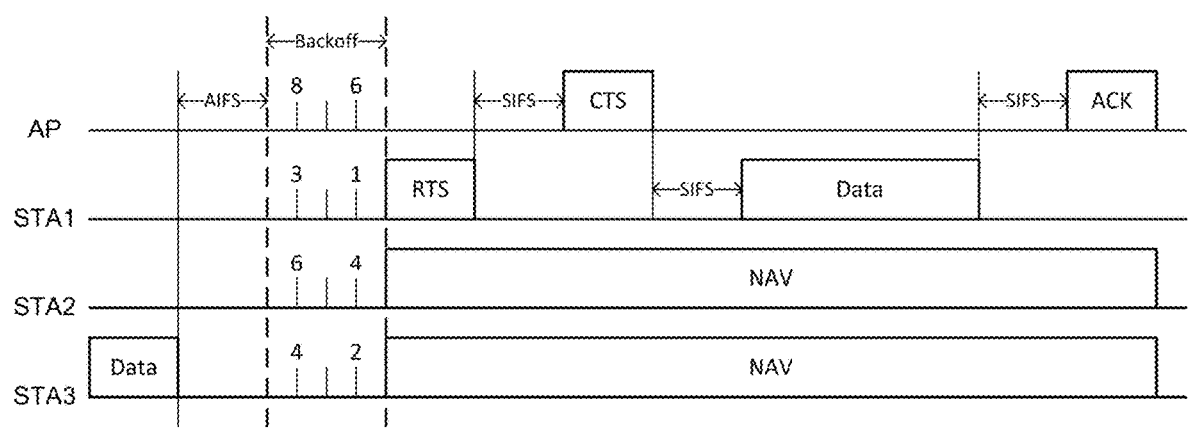
FIG. 7 is a diagram illustrating a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

Figure 8:
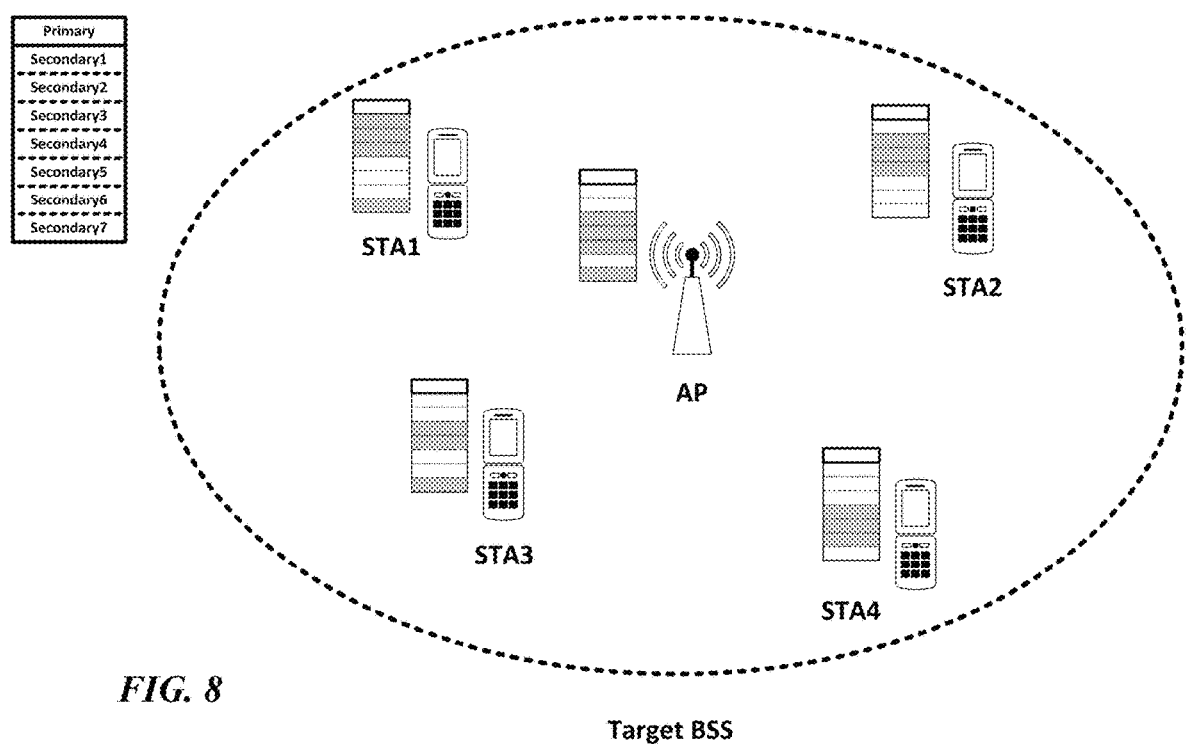
FIG. 8 is a diagram illustrating a wireless LAN network according to an embodiment of the present invention.

FIG. 8 illustrates a wireless LAN network according to an embodiment of the present invention. In FIG. 8, a BSS consists of an AP and a plurality of STAs (STA1, STA2, STA3 and STA4) associated therewith. The blocks shown with each terminal represents the channel state measured at the corresponding terminal. A shadow block indicates a busy channel, and a white block indicates an idle channel.

When using an orthogonal frequency division multiple access (OFDMA) or a multi-input multi-output (MIMO), one wireless communication terminal can simultaneously transmit data to a plurality of wireless communication terminals. Further, one wireless communication terminal can simultaneously receive data from a plurality of wireless communication terminals. For example, a multi-user downlink transmission in which an AP simultaneously transmits data to a plurality of STAs, and a multi-user uplink transmission in which a plurality of STAs simultaneously transmit data to the AP may be performed.

In order to perform the multi-user uplink transmission, the channel to be used and the transmission start time of each STA that performs uplink transmission should be adjusted. However, in a wireless LAN environment in which a plurality of BSSs are adjacent to each other, the measured channel states may be different from each other in the same BSS as shown in FIG. 8. That is, depending on the influence of the adjacent external BSS of each terminal, channels to which each terminal can access may be different from each other. In addition, whether or not each STA has data for uplink transmission changes in real time. Therefore, in order to efficiently schedule the multi-user uplink transmission, state information of each STA needs to be transmitted to the AP.

According to an embodiment of the present invention, information for scheduling of a multi-user uplink transmission may be indicated through a predetermined field of a preamble of a packet and/or a predetermined field of a MAC header. For example, a STA may indicate information for multi-user uplink transmission scheduling through a predetermined field of a preamble or a MAC header of an uplink transmission packet, and may transmit the information to an AP. In this case, the information for multi-user uplink transmission scheduling includes at least one of buffer status information of each STA, channel state information measured by each STA. The buffer status information of the STA may indicate at least one of whether the STA has uplink data to be transmitted, the access class (AC) of the uplink data and the size (or the transmission time) of the uplink data.

Figure 9:
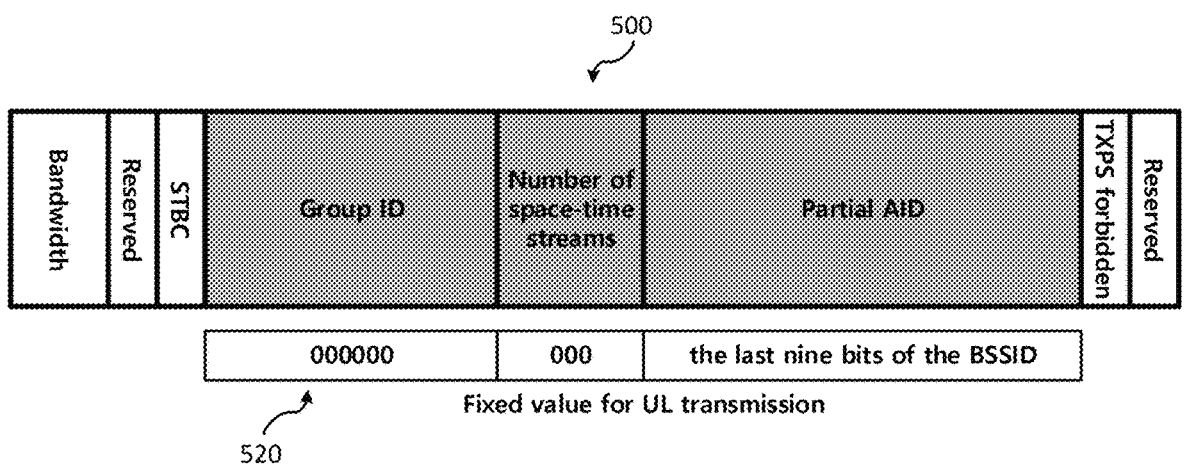
FIG. 9 is a diagram illustrating a method of configuring a preamble 500 of a wireless LAN signal according to an embodiment of the present invention.
Figure 10:
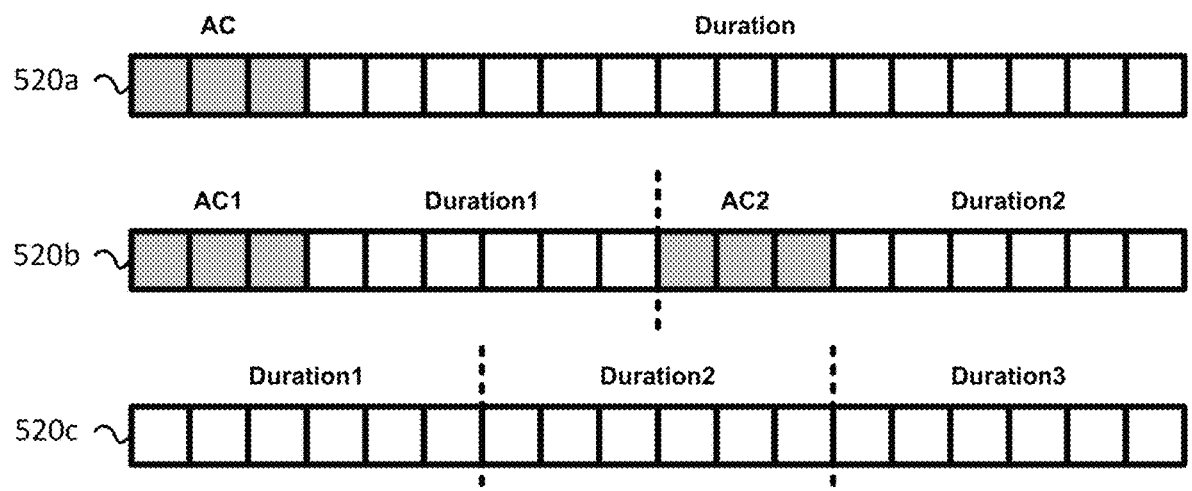
FIG. 10 is a diagram illustrating an embodiment of the present invention representing information for uplink transmission scheduling through a predetermined field of a preamble.
Figure 11:
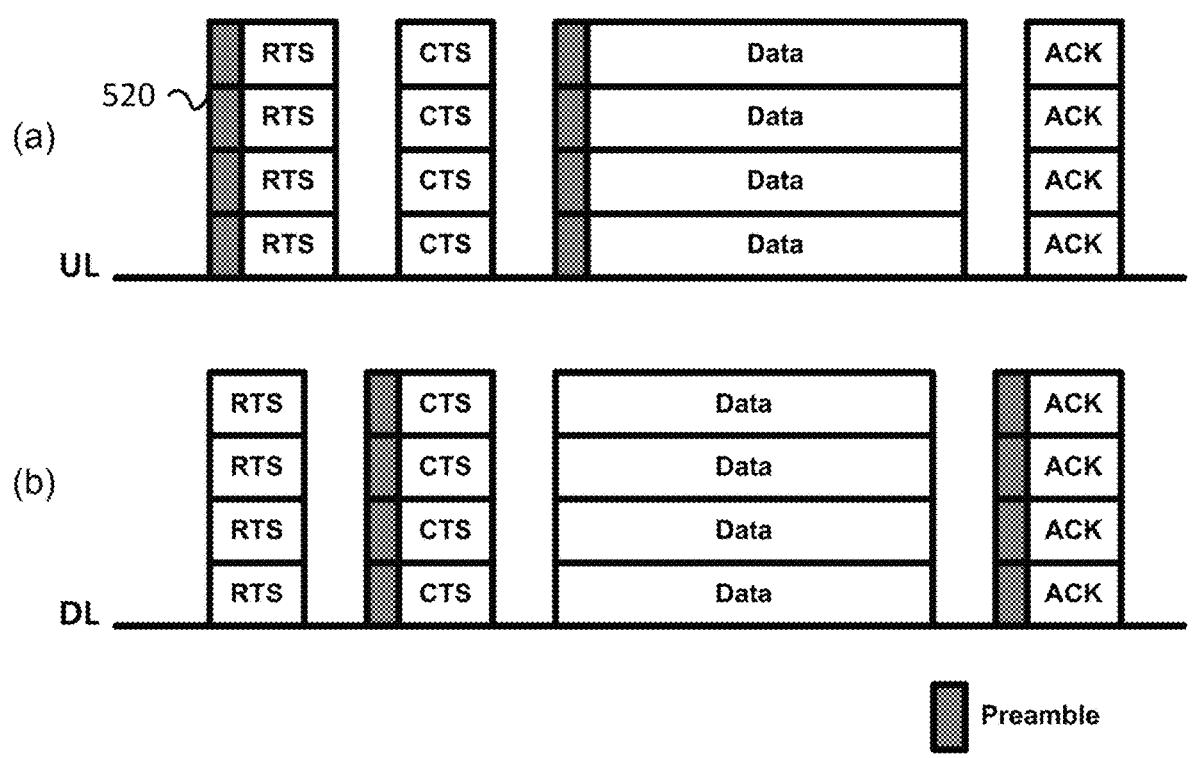
FIG. 11 is a diagram illustrating a method by which a STA of the present invention transmits information for multi-user uplink transmission scheduling.

First, FIGS. 9 to 11 illustrate methods for transmitting information for multi-user uplink transmission scheduling through a preamble of a packet.

FIG. 9 illustrates a method of configuring a preamble 500 of a wireless LAN signal according to an embodiment of the present invention. According to an exemplary embodiment, the preamble 500 of the wireless LAN signal transmitted by a terminal may include a group ID, an NSTS, and a partial AID (Association ID) fields. The predetermined field 520 consisting of the group ID, the NSTS and the partial AID is used by the AP to support multiple STA downlink access using multiple antennas. Therefore, a STA performing communication with one AP cannot utilize the predetermined field 520 as an AP. Accordingly, in the prior art, the predetermined field 520 of the preamble 500 of the uplink packet of the STA was set to a fixed value as shown in FIG. 9. That is, the bit values of the group ID and the NSTS of the predetermined field 520 were set to 0, and the partial AID was set to the last nine bits of a BSS identifier of the corresponding STA. However, since the information included in the predetermined field 520 overlaps with information carried in the MAC header, the STA can transmit additional information using the predetermined field 520 according to the embodiment of the present invention.

FIG. 10 illustrates an embodiment of the present invention representing information for uplink transmission scheduling through a predetermined field of a preamble. According to an embodiment of the present invention, at least one of an access class and duration (i.e., transmission time) of uplink data to be transmitted by the STA is included in the preamble of the uplink packet transmitted by the STA. The STA indicates the access class and duration information of the data in a buffer, i.e., an uplink transmission data queue, through a predetermined field 520 of the preamble.

According to an embodiment, the predetermined field 520 may consist of 18 bits, and represent information of uplink data by various methods as shown in FIG. 10. For example, 3 bits of the predetermined field 520a may be used to represent 8 access classes, and the remaining 15 bits may be used to indicate duration information of the data. According to another embodiment, the STA may indicate information on a plurality of packets among the data in the uplink transmission data queue through the predetermined field 520. For example, the predetermined field 520b may indicate access class and duration information for each of two packets. That is, the predetermined field 520b may include two sets of access classes (e.g., AC1 and AC2) and duration information (e.g., Duration1 and Duration2), respectively. In this case, each set may consist of an access class of 3 bits and duration information of up-scaled 6 bits. Alternatively, the predetermined field 520c may indicate duration information (Duration1, Duration2, Duration3) for three packets.

The methods of configuring the predetermined field 520 of the preamble shown in FIG. 10 represent embodiments of the present invention, but the present invention is not limited thereto. The STA of the present invention may indicate information for multi-user uplink transmission scheduling through a preamble with various methods. In addition, when information on a plurality of packets is indicated through the predetermined field 520, the STA may arrange information on each packet in an access class order or a first in first out (FIFO) order.

FIG. 11 illustrates a method by which a STA of the present invention transmits information for multi-user uplink transmission scheduling. In FIG. 11, a shadow block represents a preamble of an uplink packet generated by the STA of the present invention. The STA generates an uplink packet and transmits the uplink packet to the AP as in the above-described embodiment. The STA transmits information for multi-user uplink transmission scheduling through at least one of a request to send (RTS), a clear to send (CTS), a data packet and an ACK.

First, FIG. 11(a) illustrates an uplink data transmission state of the STA. The STA transmits an RTS for the uplink data transmission and the AP transmits a CTS in response thereto. The STA receiving the CTS from the AP transmits an uplink data packet, and the AP transmits an ACK in response thereto. In this uplink data transmission situation, the STA transmits information for multi-user uplink transmission scheduling through at least one of the RTS and the uplink data packet. That is, the preamble of at least one of the RTS and the uplink data packet is generated to have a predetermined field 520 configured as in the above-described embodiment.

Meanwhile, FIG. 11(b) illustrates a downlink data transmission state of the AP. The AP transmits an RTS for the downlink data transmission and the STA transmits a CTS in response thereto. The AP receiving the CTS from the STA transmits a downlink data packet, and the STA transmits an ACK in response thereto. In this downlink data transmission situation, the STA transmits information for multi-user uplink transmission scheduling through at least one of the CTS and the ACK. That is, the preamble of at least one of the CTS and the ACK is generated to have a predetermined field 520 configured as in the above-described embodiment.

As described above, the STA transmits information for multi-user uplink transmission scheduling to the AP through the uplink packet, so that the STA transmits information on the uplink data of the corresponding terminal to the AP. The STA indicates information for the multi-user uplink transmission scheduling using the predetermined field 520 of the preamble of the uplink packet. According to an embodiment, the predetermined field 520 may be included in the non-legacy preamble of the WLAN signal transmitted by the STA. The predetermined field 520 of the non-legacy preamble may indicate any one of VHT-SIG-A and HE-SIG-A. However, according to another embodiment of the present invention, a legacy wireless LAN signal that cannot use the non-legacy preamble may represent the information in a form of a payload. That is, at least one of a legacy RTS, a legacy CTS, a legacy data packet, and a legacy ACK transmitted through uplink may be transmitted with the information for multi-user uplink transmission scheduling attached in the form of the payload.

The AP receives the uplink packet transmitted by the STA and extracts information for multi-user uplink transmission scheduling from the received uplink packet. Information for multi-user uplink transmission scheduling may be extracted from the predetermined field 520 of the non-legacy preamble of the uplink packet. The AP obtains information for multi-user uplink transmission scheduling from uplink packets transmitted by a plurality of STAs, and schedules a multi-user uplink transmission based on the obtained information.

Figure 12:
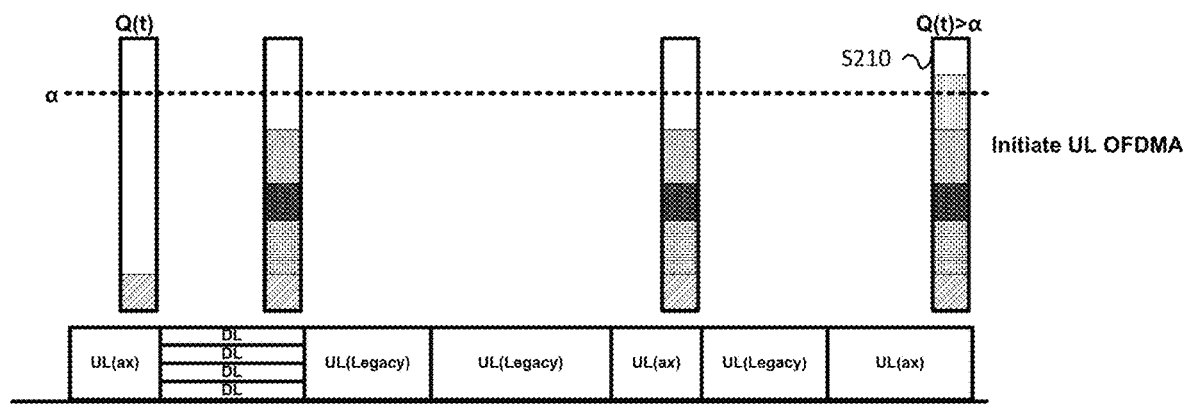
FIG. 12 is a diagram illustrating a multi-user uplink transmission triggering method according to an embodiment of the present invention.

FIG. 12 illustrates a multi-user uplink transmission triggering method according to an embodiment of the present invention. According to the embodiment of the present invention, the AP may manage a multi-user uplink information queue for multi-user uplink transmission scheduling. The multi-user uplink information queue may accumulate duration information extracted from uplink packets of a plurality of STAs. In FIG. 12, Q(t) denotes an accumulated value of a multi-user uplink information queue, and α denotes a predetermined threshold.

The AP receives uplink packets from a plurality of STAs and extracts duration information from the received uplink packets. In this case, the duration information can be extracted from the predetermined field 520 and indicates duration of data in an uplink transmission data queue of the corresponding STA. The AP accumulates the extracted duration information in the multi-user uplink information queue.

If the accumulated value Q(t) of the multi-user uplink information queue is greater than the predetermined threshold α (S210), the AP triggers a multi-user uplink transmission. The AP transmits a trigger message defined for the multi-user uplink transmission. A plurality of STAs receiving the trigger message simultaneously perform uplink data transmission to the AP at the time indicated by the trigger message. On the other hand, if a multi-user uplink transmission is triggered, the AP updates the multi-user uplink information queue. According to an embodiment, the AP resets the multi-user uplink information queue, and Q(t) may be set to zero. According to another embodiment, the AP may reduce the accumulated value of the multi-user uplink information queue by the amount of uplink data to which the uplink transmission is indicated.

Meanwhile, although the multi-user uplink information queue is described as accumulating the duration information extracted from the uplink packet, the present invention is not limited thereto. According to another embodiment of the present invention, the value accumulated in the multi-user uplink information queue may be replaced with other types of values indicating transmission time information, data size information, transmission opportunity (TXOP), and the like. The transmission time information, the data size information, and the TXOP indicate information on data in the uplink transmission data queue of the STA.

Figure 13:
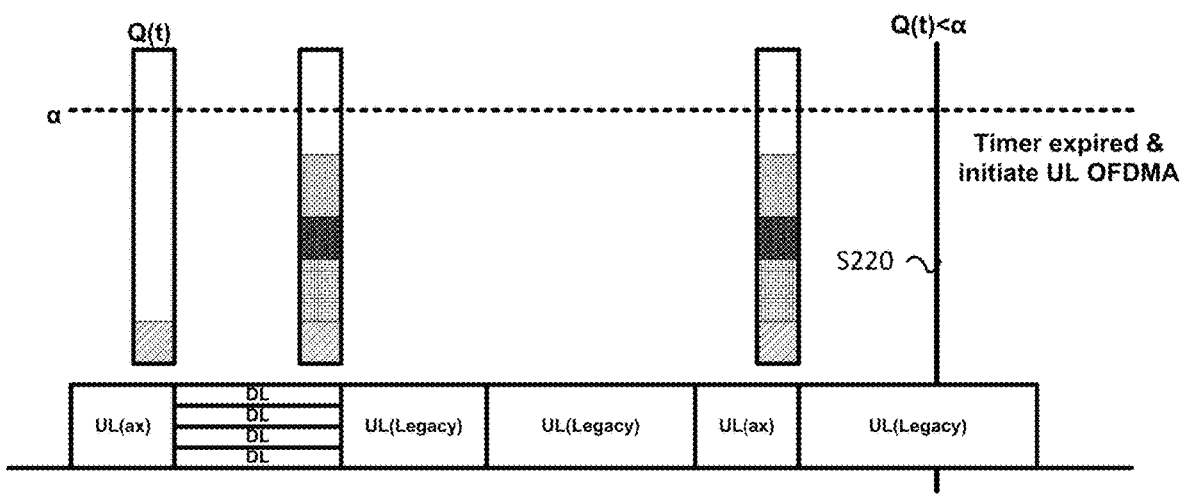
FIG. 13 is a diagram illustrating a multi-user uplink transmission triggering method according to another embodiment of the present invention.

FIG. 13 illustrates a multi-user uplink transmission triggering method according to another embodiment of the present invention. In the embodiment of FIG. 13, the same or corresponding parts as those of the embodiment of FIG. 12 will be omitted.

According to the embodiment of FIG. 13, a separate timer for multi-user uplink transmission scheduling may be set. According to an embodiment, the timer may be activated from the time when the uplink information is first stored in the multi-user uplink information queue of the AP. According to another embodiment, the timer may be active from the time when the previous multi-user uplink transmission was triggered. The AP may trigger a multi-user uplink transmission when the timer expires. According to the embodiment of the present invention, when the timer expires (S220) even though the accumulated value Q(t) of the multi-user uplink information queue is smaller than the predetermined threshold α, the AP triggers the multi-user uplink transmission. Therefore, a wait time for the uplink data transmission of a plurality of STAs can be prevented from becoming excessively large.

Figure 14:
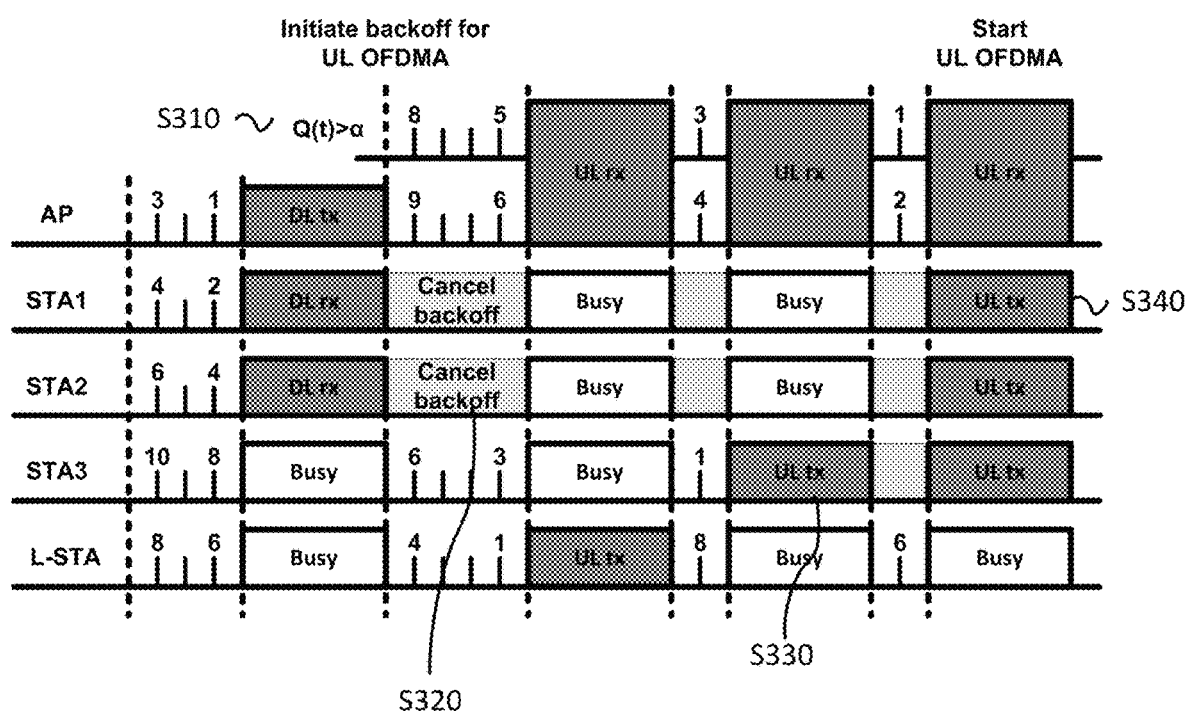
FIGS. 14 and 15 are diagrams illustrating embodiments in which a backoff procedure for multi-user uplink transmission is performed.
Figure 15:
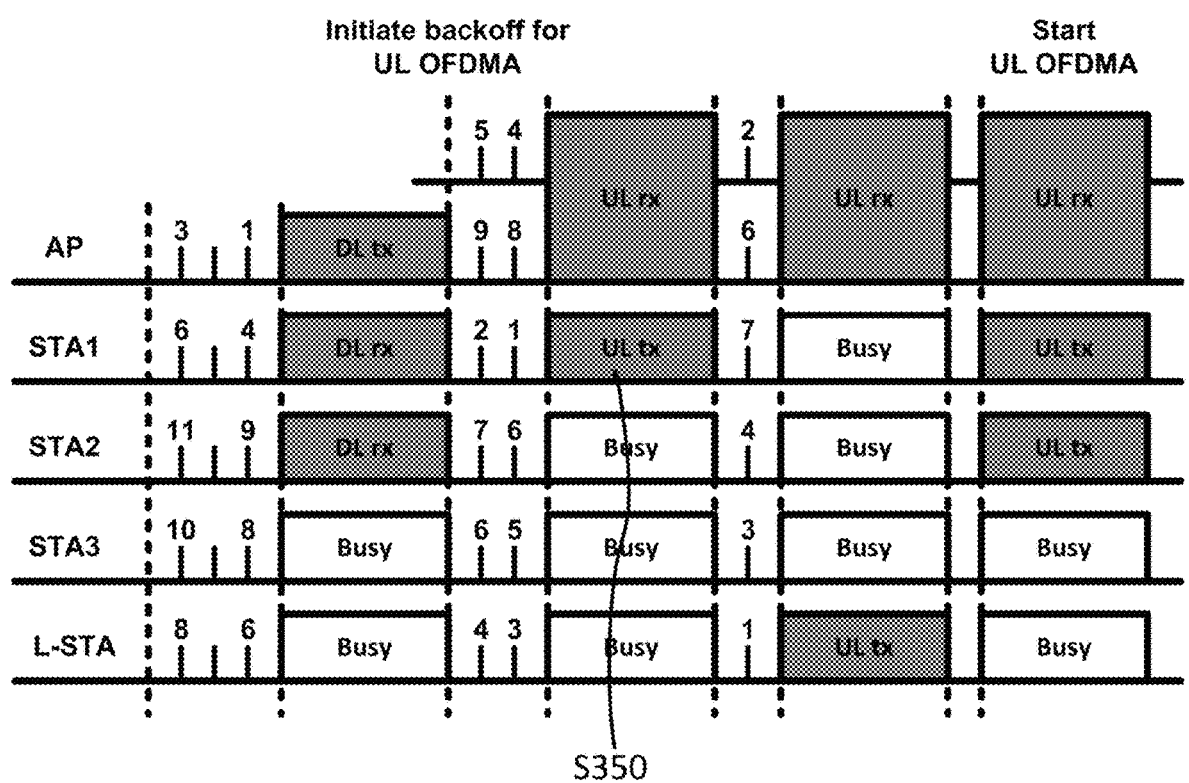

FIGS. 14 and 15 illustrate embodiments in which a backoff procedure for multi-user uplink transmission is performed. In the embodiments of FIGS. 14 and 15, the same or corresponding parts as those of the embodiment of the back-off procedure described above in FIG. 6 will be omitted.

Referring to FIG. 14, an AP according to an exemplary embodiment of the present invention may perform a separate backoff procedure to secure a multi-user uplink transmission opportunity. The AP basically allocates a backoff counter for downlink data transmission and performs a backoff procedure using the allocated backoff counter. However, according to an embodiment of the present invention, when information for multi-user uplink transmission scheduling is received from at least one STA, the AP allocates an independent backoff counter for multi-user uplink transmission and performs a backoff procedure using the allocated backoff counter. According to an embodiment, the AP may simultaneously perform a backoff procedure for the downlink data transmission and a backoff procedure for the multi-user uplink transmission. If the backoff counter of the backoff procedure for the downlink data transmission expires first, the AP performs a downlink data transmission. However, if the backoff counter of the backoff procedure for the multi-user uplink transmission expires first, the AP performs a multi-user uplink data reception. That is, the AP performs data transmission or data reception based on the backoff procedure of which the backoff counter expires first among the backoff procedures performed simultaneously.

When the accumulated value Q(t) of the multi-user uplink information queue is greater than a predetermined threshold a or the timer expires (S310), the AP allocates a backoff counter for the multi-user uplink transmission. FIG. 14 illustrates an embodiment in which 9 is assigned as a backoff counter for the multi-user uplink transmission of an AP and 10 is assigned as a backoff counter for the downlink data transmission. The AP performs a backoff procedure for the multi-user uplink transmission. In this case, a backoff procedure for downlink data transmission of the AP may also be performed simultaneously.

When the AP performs a backoff procedure for the multi-user uplink transmission, the corresponding backoff procedure may be set to have a priority over backoff procedures of other terminals. To this end, the AP may allocate a backoff counter for the multi-user uplink transmission based on a specific criterion. For example, the AP may allocate the backoff counter based on the highest access class among the access classes of the uplink data reserved for the multi-user uplink transmission. Alternatively, the AP may allocate the backoff counter in inverse proportion to the number of terminals participating in the multi-user uplink transmission.

According to the embodiment of the present invention, a STA that has transmitted information for the multi-user uplink transmission scheduling to the AP cancels the backoff procedure of the corresponding terminal (S320), and do not perform a separate backoff procedure for an uplink data transmission in the contention window interval. In this way, when the backoff procedures of a plurality of STAs to transmit uplink data is delegated to the AP, the total number of terminals participating in the backoff contention may be reduced, and the backoff collision probability between the terminals may be reduced. Meanwhile, since STA3 has not performed communication with the AP in FIG. 14, the STA3 has not been able to transmit information for scheduling the multi-user uplink transmission to the AP. Therefore, even if the AP performs the backoff procedure for the multi-user uplink transmission, the STA3 does not cancel the backoff procedure of the corresponding terminal. When the backoff procedure of the STA3 is completed, the STA3 transmits uplink data (S330). In this case, the STA3 may transmit information for the multi-user uplink transmission scheduling to the AP. Therefore, the STA3 may not perform the subsequent backoff procedure and may delegate the backoff procedure to the AP.

When the backoff procedure for the multi-user uplink transmission expires, at least one STA transmits uplink data to the AP (S340). To solicit the multi-user uplink transmission, the AP may transmit a separate trigger message. The AP receives multi-user uplink data from at least one STA.

Meanwhile, according to the embodiment of FIG. 15, the STA that has transmitted information for the multi-user uplink transmission scheduling to the AP may perform an individual backoff procedure without canceling the backoff procedure of the corresponding terminal. In FIG. 15, the backoff procedure of the STA1 is completed before the backoff procedure for the multi-user uplink transmission of the AP, and the STA1 individually transmits uplink data to the AP (S350).

According to the embodiment of the present invention, whether or not the backoff procedure of the STA that has transmitted the information for the multi-user uplink transmission scheduling to the AP is canceled may be determined based on predetermined conditions. If the access class of data in the uplink transmission data queue of the STA is above a certain level, the STA may perform a separate backoff procedure for uplink data transmission without canceling the backoff procedure. According to another embodiment, if the remaining backoff counter of the STA is less than or equal to a predetermined value, the STA may perform a separate backoff procedure for uplink data transmission without canceling the backoff procedure. Otherwise, the STA can cancel the backoff procedure for uplink data transmission and delegate the backoff procedure of the corresponding terminal to the AP.

Figure 16:
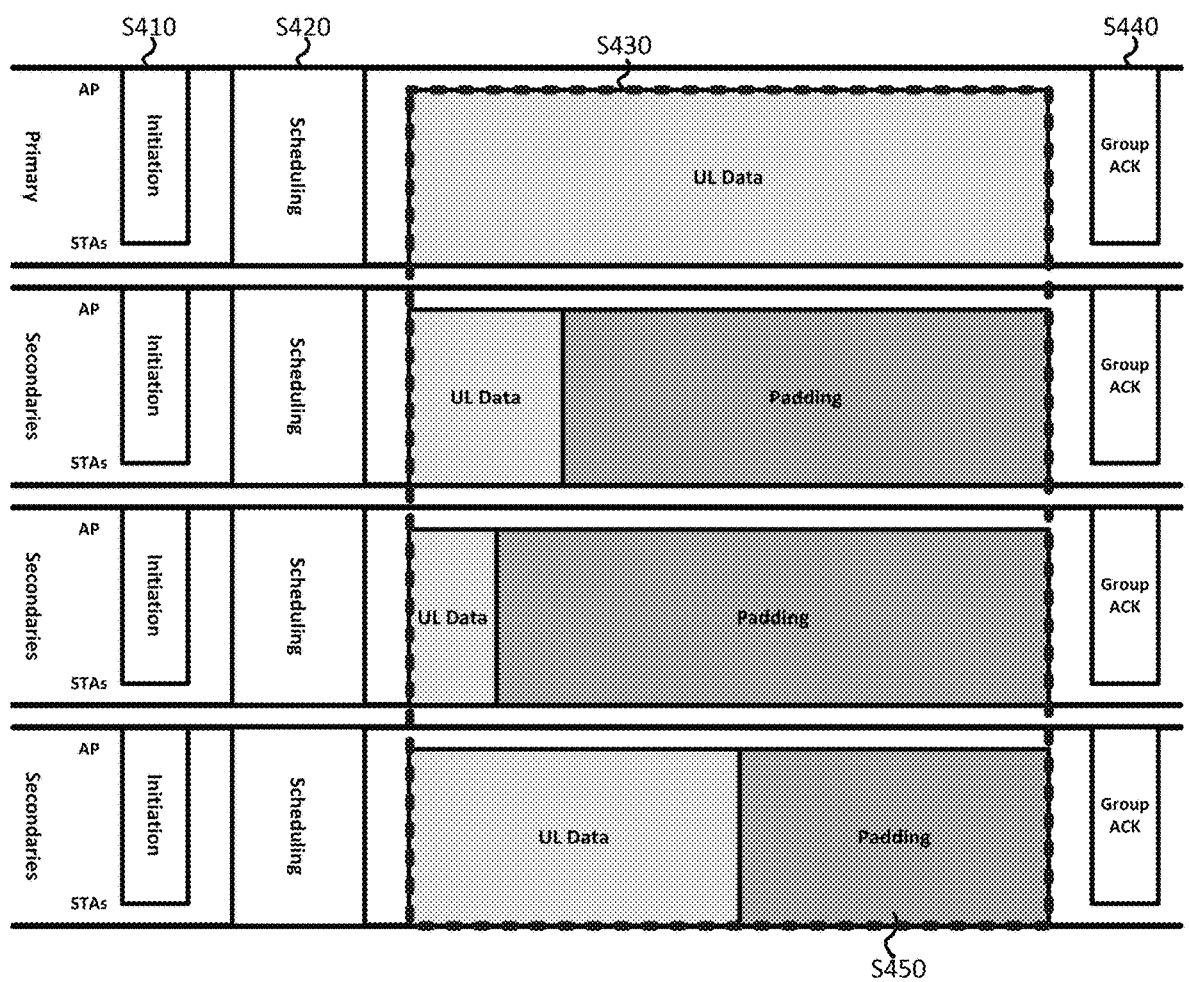
FIG. 16 is a diagram illustrating a sequence of processes in which a multi-user uplink transmission is performed.

FIG. 16 illustrates a sequence of processes in which a multi-user uplink transmission is performed. The multi-user uplink transmission process may be managed by the AP because a plurality of terminals simultaneously transmit data. Therefore, in order to allocate resources and prevent data collision, the AP should obtain the buffer status information of each STA and deliver the accurate transmission time point information to each STA before the start of multi-user uplink transmission. The buffer status information of the STA may indicate at least one of whether the STA has uplink data to be transmitted, the access class (AC) of the uplink data, and the size (or the transmission time) of the uplink data. Such information delivery of each STA may be performed through an initialization step S410 and a scheduling step S420 for the multi-user uplink transmission.

According to an embodiment of the present invention, the scheduling step S420 for the multi-user uplink transmission is performed in advance to collect related information, and the initialization step S410 may be performed if a specific condition is satisfied. Alternatively, the initialization step S410 may be performed in advance according to the time condition, and then the scheduling step S420 may be performed next to collect the related information. The initializing step S410 and the scheduling step S420 include a process of exchanging information on channels available to the AP and the STA. According to an exemplary embodiment, the AP may transmit available channel information to a plurality of STAs in advance, and the plurality of STAs may feedback channel information available to the corresponding STA among the channels available to the AP. The specific operation method of the initializing step S410 and the scheduling step S420 in the embodiment of the present invention is not limited thereto. According to an embodiment, the initialization step S410 and the scheduling step S420 may be performed with an integrated operation.

When the initialization step S410 and the scheduling step S420 are performed, a multi-user uplink data transmission step S430 is performed. At least one STA assigned a channel or a subchannel from the AP simultaneously transmits uplink data at the time point designated by the AP. The STA may perform uplink data transmission through a 20 MHz channel basis or a wideband channel basis over the 20 MHz. In addition, the non-legacy STA may perform uplink data transmission through a sub-channel basis smaller than 20 MHz. The AP receiving the uplink data from the STA transmits an ACK in response thereto (S440). If uplink data transmission is performed through a subchannel basis, a plurality of STAs can transmit uplink data through one channel. In this case, the AP may transmit a group ACK through the corresponding channel to transmit an ACK for a plurality of STAs that transmitted the uplink data.

In case of being affected by a plurality of external BSSs in a dense BSS environment, the available channels of each terminal may be different from each other according to the geographical location of the wireless terminal. Therefore, the number of terminals capable of data transmission through each channel may be different from each other. In this case, as shown in FIG. 16, the air time during which actual uplink data transmission is performed may be different for each channel. However, if the AP cannot simultaneously perform data transmission and reception, the AP cannot transmit an ACK through another channel in which uplink data transmission has been completed while receiving uplink data through a channel in which the air time is long. Therefore, the STAs using the channel in which the air time is short may perform zero padding until the uplink data transmission of a channel having the longest air time is completed, to wait for ACK reception. However, when zero padding is performed, the channel is occupied regardless of data transmission, so that the spectrum efficiency is reduced. Also, terminals of the external BSS using the corresponding channel as a primary channel cannot perform communication during the zero padding period.

Figure 17:
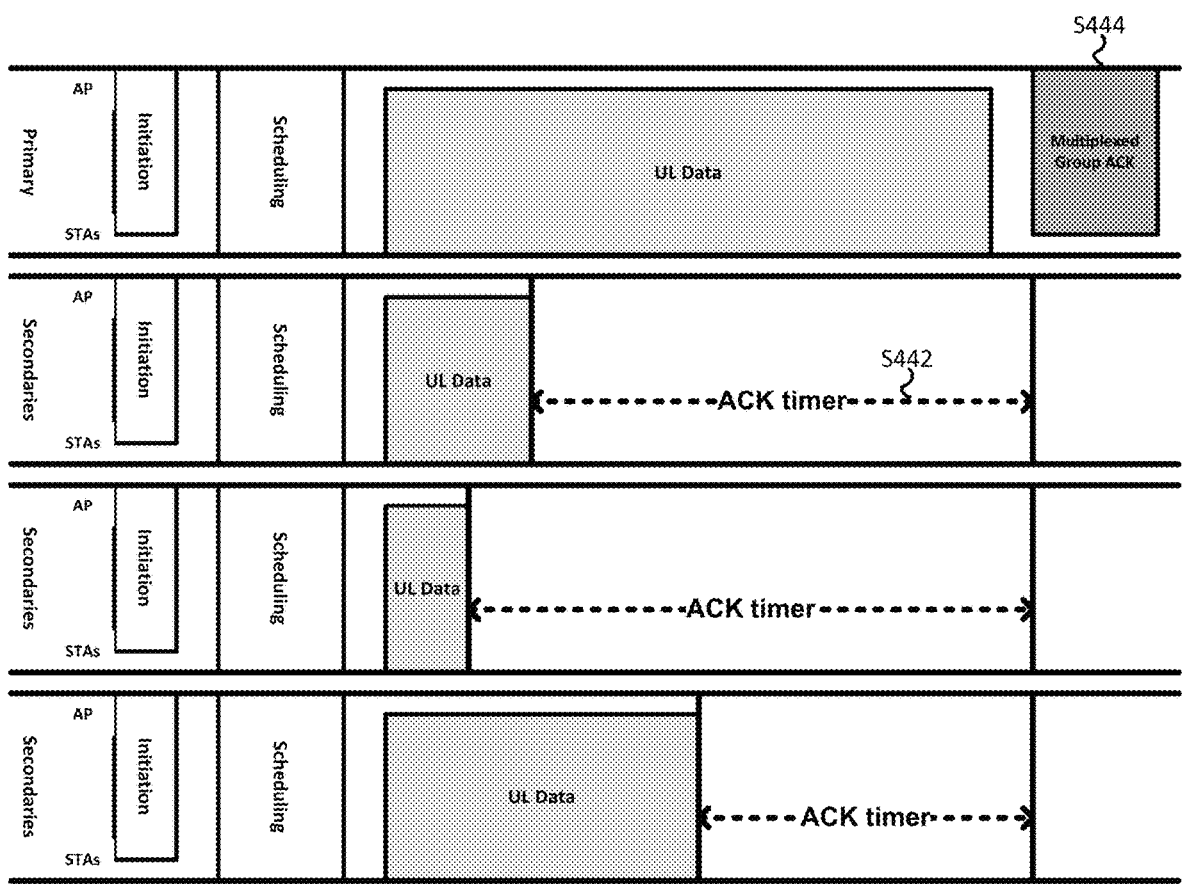
FIG. 17 is a diagram illustrating an ACK transmission method for multi-user uplink transmission according to an embodiment of the present invention.

FIG. 17 illustrates an ACK transmission method for multi-user uplink transmission according to an embodiment of the present invention. When the multi-user uplink transmission is completed, the AP transmits a multiplexed group ACK in response thereto (S444). In this case, the AP may transmit the multiplexed group ACK through a channel having the longest air time among the plurality of channels in which the multi-user uplink transmission is performed. According to an embodiment, the channel having the longest air time may be the primary channel of the BSS.

The STAs in which the other channel is assigned as the uplink data transmission channel set an ACK timer at the time when the uplink data transmission of the corresponding channel ends, and wait for ACK reception until the set ACK timer expires (S442). In this case, the other channel may be a channel other than the channel having the longest air time, that is, a secondary channel of the corresponding BSS. The ACK timer of each channel indicates the time from when the uplink data transmission of the corresponding channel is completed to when the multiplexed group ACK is transmitted. For the setting of the ACK timer, each STA should obtain information on the transmission time point of the multiplexed group ACK. The transmission time point information of the multiplexed group ACK may be transmitted to each STA which is intended to perform uplink data transmission in the initialization step S410 and/or the scheduling step S420. According to an exemplary embodiment, the STA that the ACK timer is set may switch to a sleep mode until the corresponding timer expires to perform a power saving.

As described above, according to the embodiment of the present invention, each secondary channel can be returned immediately after the uplink data transmission is completed. Therefore, the terminals of the external BSS using the corresponding secondary channel as a primary channel may access the channel and transmit data at an earlier time point. Thus, the overall spectral efficiency of the network can be improved.

Figure 18:
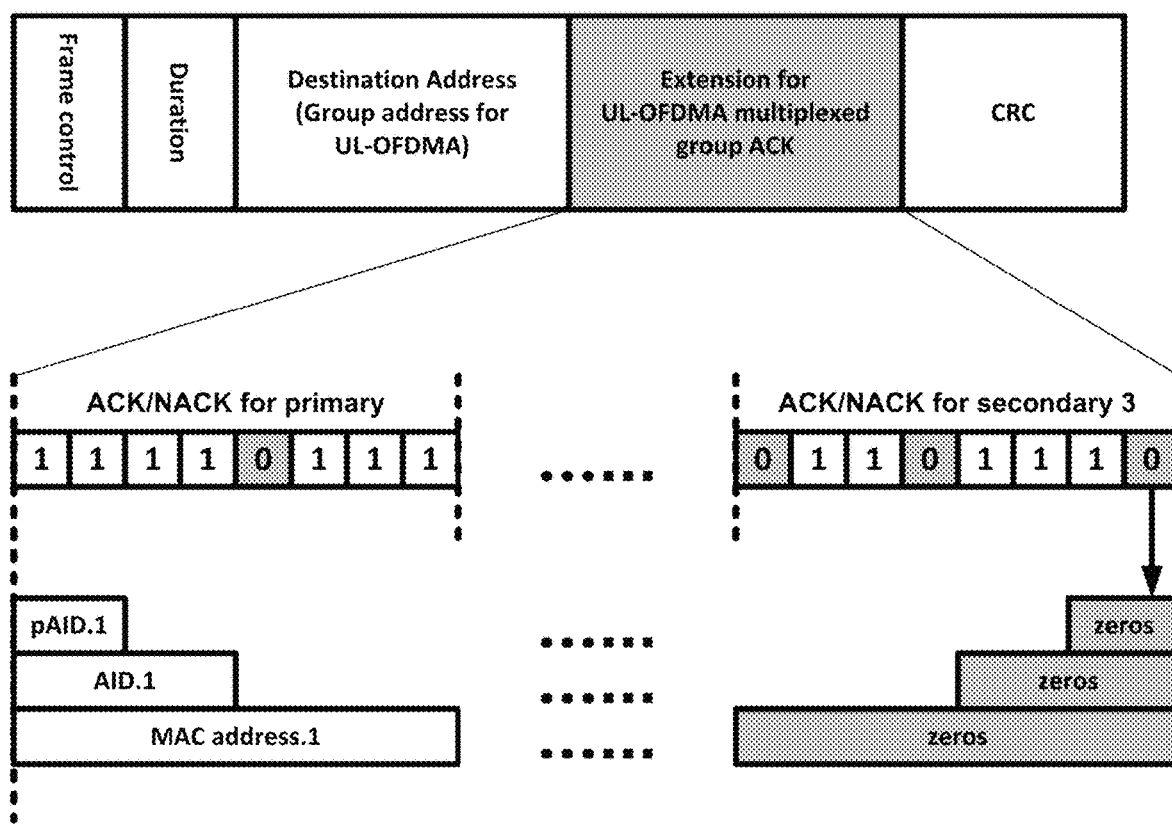
FIG. 18 is a diagram illustrating a frame structure of a multiplexed group ACK according to an embodiment of the present invention.

FIG. 18 illustrates a frame structure of a multiplexed group ACK according to an embodiment of the present invention. The multiplexed group ACK may be configured such that extended information is additionally inserted into the existing ACK frame. The destination address (DA) of the multiplexed group ACK may be assigned a group address for multi-user uplink transmission. Also, the multiplexed group ACK includes an extension field, and the extension field indicates ACK information for each STA.

The extended field may indicate ACK information of each channel or subchannel by configuring a bitmap in units of channels or subchannels used for the multi-user uplink transmission. According to an exemplary embodiment, the extension field may indicate whether or not data of each channel or subchannel is received in an ACK format. That is, the bit corresponding to the channel or the subchannel on which the uplink data is received may be set to 1, and the bit corresponding to the channel or subchannel on which the uplink data is not received may be set to zero. According to another embodiment of the present invention, the extension field may indicate whether the data of each channel or subchannel is received in a NACK format. In this case, the bit corresponding to each channel or subchannel is set opposite to the ACK format.

According to yet another embodiment of the present invention, the extension field may indicate the ACK information by sequentially listing a partial AID, an AID, or a MAC address in the order assigned to each channel or subchannel. If the AP normally receives the uplink data, the extension field may indicate a partial AID, an AID or a MAC address of the STA that transmitted the corresponding data. However, if the AP does not normally receive the uplink data, a partial AID, an AID or a MAC address of the STA that transmitted the corresponding data may be omitted in the extended field or the corresponding field may be filled with 0. According to an embodiment, the extension field has a variable length depending on whether the AP receives the uplink data.

Figure 19:
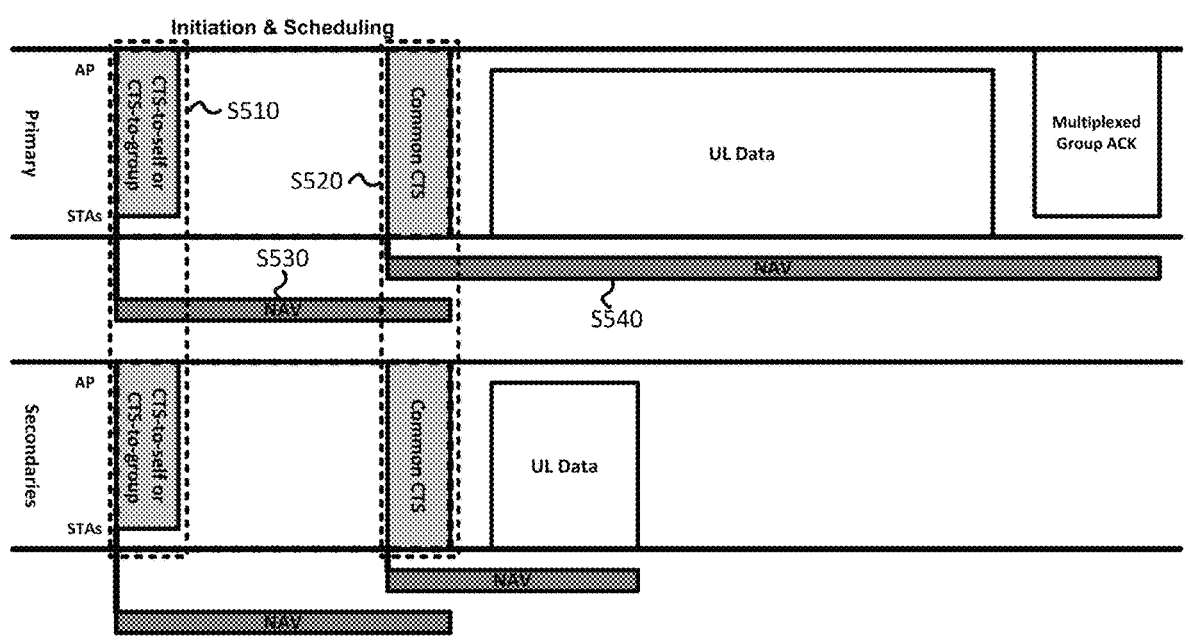
FIG. 19 is a diagram illustrating a NAV setting method for a multi-user uplink transmission according to an embodiment of the present invention.

FIG. 19 illustrates a NAV setting method for a multi-user uplink transmission according to an embodiment of the present invention. In the multi-user uplink transmission process, NAV setting of terminals not participating in the data transmission is required. In particular, when the multi-user uplink transmission is performed through a subchannel basis, a method of allowing legacy terminals that cannot receive subchannel data to correctly set NAV is needed.

According to the embodiment of the present invention, the AP transmits a frame for NAV setting in the multi-user uplink transmission process (S510). The frame for NAV setting may be transmitted at the time when the AP initiates the multi-user uplink transmission, and an RTS or a CTS of a predetermined format may be used. According to an embodiment, the frame for NAV setting may be one of a predefined multi-user RTS, RTS-to-self, CTS-to-self, and CTS-to-group. The frame for NAV setting requests CTS frame transmission of STAs to perform uplink data transmission.

A plurality of STAs receiving the frame for NAV setting simultaneously transmit a CTS frame (S520). The AP receives CTS frames transmitted simultaneously by the plurality of STAs. According to an embodiment of the present invention, CTS frames transmitted simultaneously by a plurality of STAs have the same waveform. According to an embodiment of the present invention, CTS frames transmitted simultaneously by a plurality of STAs may have the same waveform at least for each channel. That is, a particular CTS frame transmitted through the first channel has the same waveform as another CTS frame transmitted through the first channel. According to a further embodiment of the present invention, CTS frames transmitted simultaneously by a plurality of STAs may have the same waveform in all channels. That is, a particular CTS frame transmitted through the first channel has the same waveform as another CTS frame transmitted through the second channel. The CTS frames are transmitted through a channel indicated by the frame for NAV setting.

NAVs of the neighboring terminals are set based on the frame for NAV setting and the CTS frame which are transmitted as above (S530, S540). Since CTS frames having the same waveform are simultaneously transmitted through a 20 MHz channel basis, neighboring terminals including the legacy terminal can receive the CTS frame and set a NAV. According to an embodiment, the frame for NAV setting transmitted by the AP may set a NAV for the period up to the initialization step and the scheduling steps and CTS frames transmitted by a plurality of STAs may set a NAV for a period up to the transmission of uplink data and the transmission of an ACK frame. When the CTS frames transmitted simultaneously have the same waveform for each channel, the CTS frames may have duration information reflecting the air time of the corresponding channel. Accordingly, the terminal of the external BSS that has obtained the NAV information set on the specific channel may access the corresponding channel immediately after the corresponding NAV time has expired.

If the NAV is set according to the above-described embodiment, a multi-user uplink transmission may be started. According to an embodiment of the present invention, the AP may send a trigger message in response to the receipt of the simultaneous CTS frame to start the multi-user uplink transmission. The trigger message triggers the multi-user uplink transmission. A plurality of STAs receiving the trigger message simultaneously transmit uplink data at the time designated by the trigger message. The AP that receives the uplink data from the plurality of STAs transmits a group ACK in response thereto. In this case, the transmitted group ACK may be a multiplexed group ACK as in the above embodiment.

Figure 20:
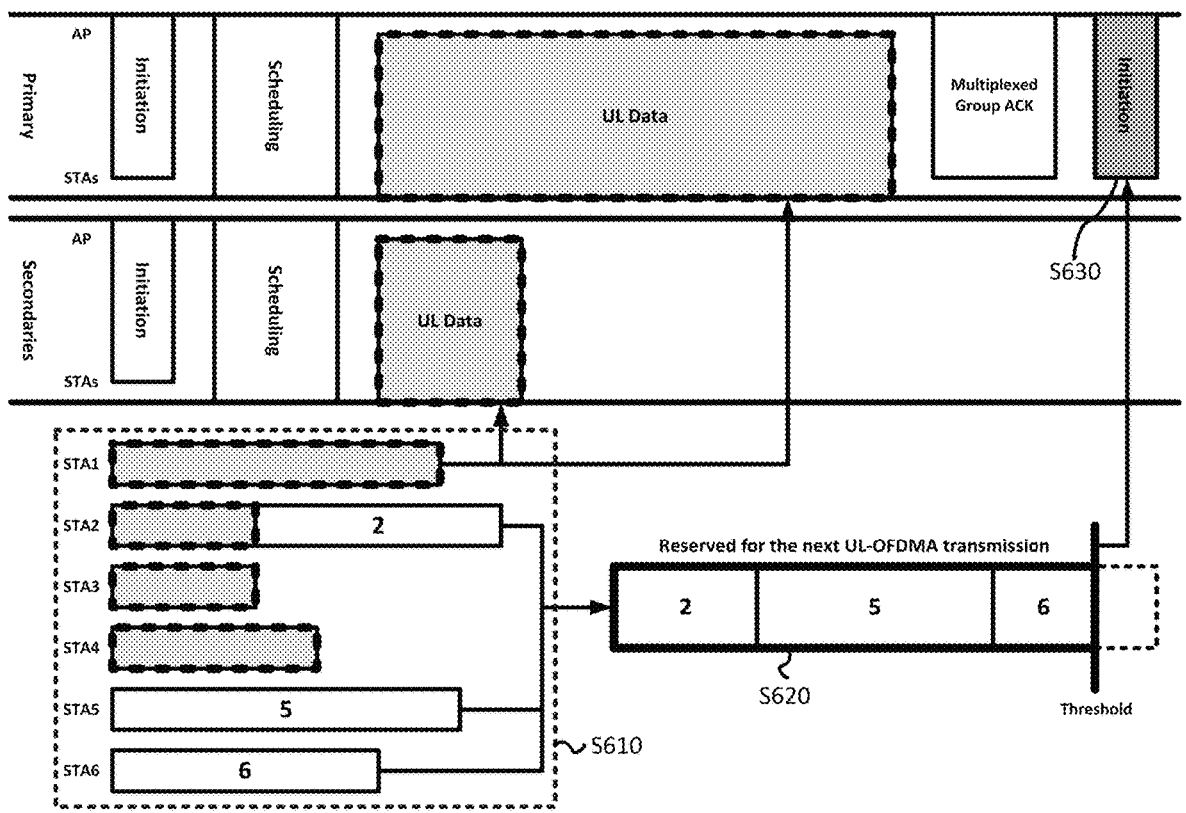
FIG. 20 is a diagram illustrating a continuous multi-user uplink transmission method according to an embodiment of the present invention.

FIG. 20 illustrates a continuous multi-user uplink transmission method according to an embodiment of the present invention. The scheduling of the multi-user uplink transmission may be variously implemented depending on the information exchanged between the AP and the STA in the process. In order to increase the efficiency of resource allocation, the AP should obtain accurate size information of uplink data of each STA in the scheduling step. On the contrary, in order to reduce the overhead of the scheduling step, it is also possible to indicate the presence of uplink data in the buffer of each STA in a form of a flag to transmit minimum information. Also, in the multi-user uplink data transmission process, a method for scheduling STAs that have attempted to access but have not been allocated resources, and a method for scheduling STAs that have performed uplink data transmission but still have remaining uplink data in the buffer are required.

According to the embodiment of the present invention, the STAs participating in the multi-user uplink transmission represent information of additional uplink data of the corresponding STA through the uplink data packet. The additional uplink data refers to additional uplink data remaining in the STA's buffer, i.e., uplink transmission data queue. The information of additional uplink data may be indicated through a predetermined field of the MAC header or a predetermined field of the preamble (e.g., HE-SIG-B) of the uplink data packet. The STA having additional uplink data generates an uplink data packet, and a predetermined field of the uplink data packet indicates information on the additional uplink data. The STA transmits the generated uplink data packet to the AP, and delivers information on the additional uplink data.

Referring to FIG. 20, STAs having additional uplink data remaining in the uplink transmission data queue may indicate at least one of the access class and the transmission time information of the uplink data through a predetermined field (S610). In the embodiment of FIG. 20, STA1 to STA6 attempt to transmit data, and resources are allocated to uplink data of STA1, STA2, STA3, and STA4, but no resources are allocated to some data of STA2 and data of STA5 and STA6. In this case, the STA2 transmitting the uplink data may indicate the information on the additional uplink data through the predetermined field of the uplink data packet.

The AP extracts information on additional uplink data from the predetermined field of the uplink data packet transmitted by a plurality of STAs, and schedules a multi-user uplink transmission based on the extracted information (S620). To this end, the AP updates the multi-user uplink information queue based on the extracted information on the additional uplink data and schedules the multi-user uplink transmission based on the updated multi-user information queue. The AP may accumulate data size information, that is, transmission time information of additional uplink data obtained from the plurality of STAs, in the multi-user uplink information queue. According to an exemplary embodiment, the AP may obtain information on the STA that has attempted to access but has not been allocated resources, and may update the multi-user uplink information queue to include uplink data of the corresponding STA.

Next, if the accumulated value of the multi-user uplink information queue is greater than the predetermined threshold value, the AP triggers the multi-user uplink transmission (S630). In the embodiment of FIG. 20, since the accumulated data sizes of STA2, STA5, and STA6 have exceeded the predetermined threshold, the AP induces a multi-user uplink transmission through an initialization step a predetermined IFS time after a multiplexed group ACK of the previous multi-user uplink transmission is transmitted. In this case, the predetermined IFS time may be a SIFS, but the present invention is not limited thereto.

Figure 21:
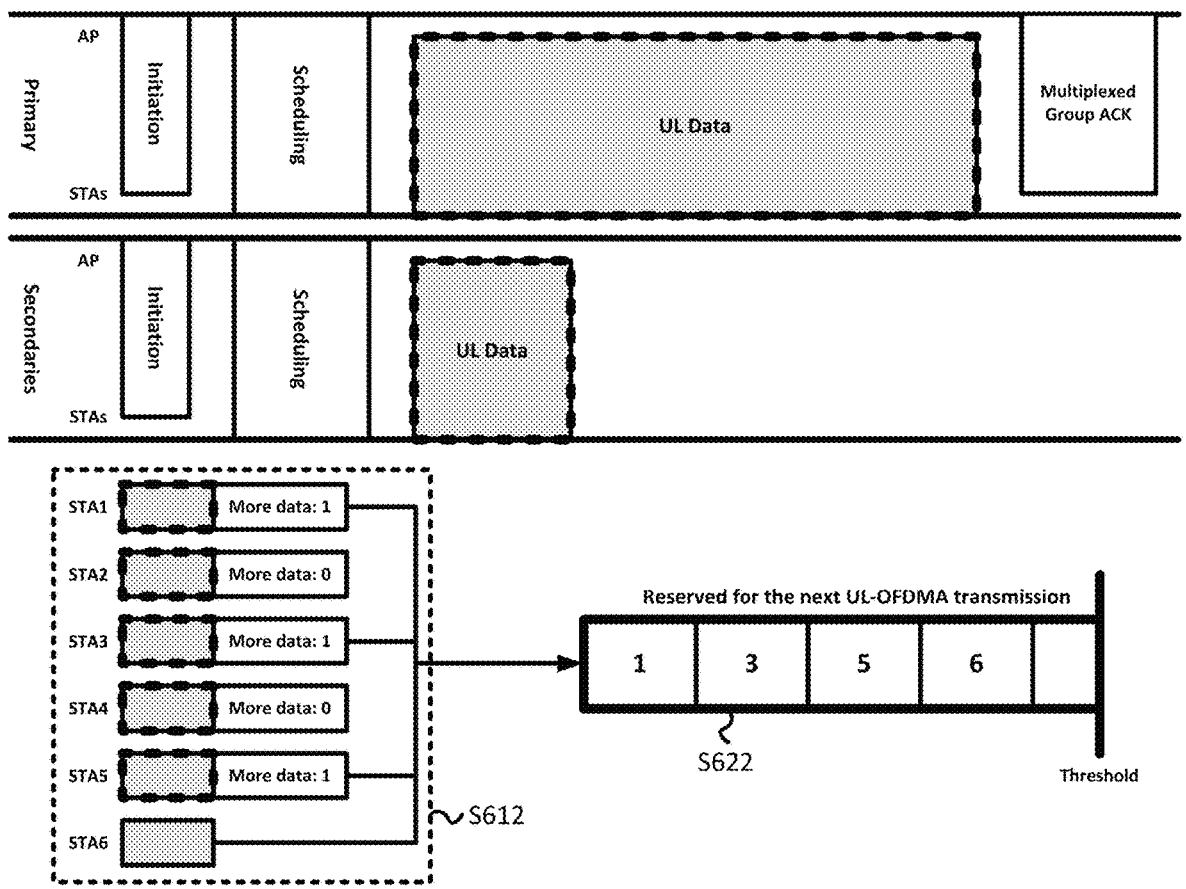
FIG. 21 is a diagram illustrating a continuous multi-user uplink transmission method according to another embodiment of the present invention.

FIG. 21 illustrates a continuous multi-user uplink transmission method according to another embodiment of the present invention. In the embodiment of FIG. 21, the same or corresponding parts as those of the embodiment of FIG. 20 will be omitted.

According to the embodiment of FIG. 21, STAs in the scheduling step of the multi-user uplink transmission may only feedback the presence of additional uplink data remaining in the buffer, that is, the uplink transmission data queue. That is, STAs having additional uplink data remaining in the uplink data queue may indicate the presence of additional uplink data through a predetermined field (S612). The predetermined field may be set to 1-bit indicator indicating more data. If the value of the indicator is 1, it indicates that there is additional uplink data in the STA. If the value of the indicator is 0, it indicates that there is no additional uplink data in the STA. In the embodiment of FIG. 21, STA1 to STA6 attempt to transmit data, and resources are allocated to STA1, STA2, STA3, STA4, and STA5, but resources are not allocated to STA6. STA1, STA2, STA3, STA4, and STA5 to which resources are allocated indicate the presence of additional uplink data through an uplink data packet in the more data bit. That is, the STA1, STA3, and STA5 having additional uplink data transmit the more data bit by setting the value as 1, and the STA2 and STA4 having no additional uplink data transmit the more data bit by setting the value as 0.

The AP extracts information on the presence of additional uplink data from the predetermined field of the uplink data packet transmitted by the plurality of STAs and schedules a multi-user uplink transmission based on the extracted information (S622). According to the embodiment of the present invention, the AP may store identifier information of STAs indicating that additional uplink data is present through the predetermined field in the multi-user uplink information queue. If the number of identifiers of the STAs stored in the multi-user uplink information queue is greater than a predetermined number, the AP triggers the multi-user uplink transmission.

According to an embodiment of the present invention, the AP may allocate resources of a fixed size for each STA performing the multi-user uplink transmission. The AP allocates a fixed data transmission size for each STA indicating that additional uplink data is present through the predetermined field, and accumulates the data transmission size allocated to each STA in the multi-user uplink information queue. If the accumulated value of the multi-user uplink information queue is greater than a predetermined threshold, the AP triggers the multi-user uplink transmission.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
a processor; and
a communication unit,
wherein the processor is configured to:

transmit, to a base wireless communication terminal, an uplink frame for allocating a resource for transmitting an uplink data,
wherein the uplink frame includes first size information and second size information related to the uplink data, and
transmit, to the a base wireless communication terminal, the uplink data based on the resource allocated based on the uplink frame,
wherein each of the first size information and the second size information indicates a size of a queue in which the uplink data is stored.

2. The wireless communication terminal of claim 1,
wherein the first size information indicates a size related to uplink data corresponding to a first access class set, and
wherein the second size information indicates a size related to uplink data corresponding to the second set of access classes.

3. The wireless communication terminal of claim 2,
wherein the first size information indicates a size of a first queue in which the uplink data is stored according to the first access class set, and
wherein the second size information indicates a size of a second queue in which the uplink data is stored according to the second access class set.

4. The wireless communication terminal of claim 1,
wherein the second access class set includes at least one access class which is not included in the first access class set.

5. The wireless communication terminal of claim 1,
wherein the first size information and the second size information are included in buffer status information of the wireless communication terminal and transmitted through the uplink frame.

6. The wireless communication terminal of claim 5,
wherein the buffer status information includes at least one of an access class information of the uplink data and size information of the uplink data.

7. The wireless communication terminal of claim 1,
wherein the first size information and the second size information are used for multi-user uplink transmission scheduling of the base wireless communication terminal.

8. A wireless communication method of a wireless communication terminal, the method comprising:
transmitting, to a base wireless communication terminal, an uplink frame for allocating a resource for transmitting an uplink data,
wherein the uplink frame includes first size information and second size information related to the uplink data; and
transmitting, to the a base wireless communication terminal, the uplink data based on the resource allocated based on the uplink frame,
wherein each of the first size information and the second size information indicates a size of a queue in which the uplink data is stored.

9. The wireless communication terminal of claim 8,
wherein the first size information indicates a size related to uplink data corresponding to a first access class set, and
wherein the second size information indicates a size related to uplink data corresponding to the second set of access classes.

10. The wireless communication terminal of claim 9,
wherein the first size information indicates a size of a first queue in which the uplink data is stored according to the first access class set, and
wherein the second size information indicates a size of a second queue in which the uplink data is stored according to the second access class set.

11. The wireless communication terminal of claim 8,
wherein the second access class set includes at least one access class which is not included in the first access class set.

12. The wireless communication terminal of claim 8,
wherein the first size information and the second size information are included in buffer status information of the wireless communication terminal and transmitted through the uplink frame.

13. The wireless communication terminal of claim 12,
wherein the buffer status information includes at least one of an access class information of the uplink data and size information of the uplink data.

14. The wireless communication terminal of claim 8,
wherein the first size information and the second size information are used for multi-user uplink transmission scheduling of the base wireless communication terminal.

* * * * *